US010187788B2

(12) United States Patent
Yang (10) Patent No.: US 10,187,788 B2
(45) Date of Patent: Jan. 22, 2019

(54) EMBEDDED UNIVERSAL INTEGRATED CIRCUIT CARD (EUICC) FILE SYSTEM MANAGEMENT WITH PROFILE SWITCHING

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/366,737

(22) Filed: Dec. 1, 2016

(65) Prior Publication Data

US 2017/0171742 A1  Jun. 15, 2017

Related U.S. Application Data

(60) Provisional application No. 62/266,464, filed on Dec. 11, 2015.

(51) Int. Cl.
*H04W 8/24* (2009.01)
*H04W 8/18* (2009.01)
*G06F 3/06* (2006.01)

(52) U.S. Cl.
CPC .......... *H04W 8/245* (2013.01); *G06F 3/0604* (2013.01); *G06F 3/0643* (2013.01); *G06F 3/0673* (2013.01); *H04W 8/18* (2013.01)

(58) Field of Classification Search
CPC ..... H04W 4/001; H04W 4/003; H04W 8/183; H04W 88/06; H04W 8/20; H04W 8/205; H04W 8/18; H04W 8/22; H04W 8/265; H04W 8/245; G06F 3/0673; G06F 3/0604; G06F 3/0643
See application file for complete search history.

(56) References Cited

U.S. PATENT DOCUMENTS

| 9,510,186 | B2* | 11/2016 | Li ........................ H04W 8/183 |
| 9,736,678 | B2* | 8/2017 | Li ........................ H04W 8/183 |
| 2012/0331292 | A1* | 12/2012 | Haggerty ............ H04L 63/0272 713/168 |
| 2014/0219447 | A1* | 8/2014 | Park ...................... H04W 12/08 380/247 |

(Continued)

OTHER PUBLICATIONS

EUICC Profile Package: Interoperable Format Technical Specification, Version 1.0, dated Jun. 25, 2015, by simalliance.*

(Continued)

*Primary Examiner* — Daniel Lai
(74) *Attorney, Agent, or Firm* — Dickinson Wright RLLP (57) ABSTRACT

Methods and apparatus for dynamic file system management of an embedded Universal Integrated Circuit Card (eUICC) in response to changes for electronic Subscriber Identity Modules (eSIMs) on the eUICC are disclosed herein. Hardware specific file information, e.g., hardware-based eUICC parameters, which may apply to multiple eSIMs and/or multiple Mobile Network Operators (MNOs), is included in a default eUICC file system. MNO specific information, e.g., MNO-specified parameters, is included in eSIMs. Customized eUICC level files are created, stored, modified and/or replaced based on a combination of default eUICC files and MNO specific information extracted from an eSIM at installation and/or in response to a change of state of the eSIM, such as when enabling, disabling, or updating the eSIM on the eUICC.

20 Claims, 7 Drawing Sheets

(56) References Cited

U.S. PATENT DOCUMENTS

| | | | | |
|---|---|---|---|---|
| 2015/0148032 A1* | 5/2015 | Rainer | ............... | H04W 8/205 |
| | | | | 455/432.1 |
| 2015/0156679 A1* | 6/2015 | Li | ............... | H04W 8/183 |
| | | | | 370/331 |
| 2015/0271173 A1* | 9/2015 | Seo | ............... | H04L 63/0853 |
| | | | | 726/9 |
| 2015/0281964 A1* | 10/2015 | Seo | ............... | H04L 63/102 |
| | | | | 726/9 |
| 2016/0021529 A1* | 1/2016 | Park | ............... | H04W 8/205 |
| | | | | 455/410 |
| 2016/0088464 A1* | 3/2016 | Hans | ............... | H04W 8/183 |
| | | | | 455/558 |
| 2016/0302070 A1 | 10/2016 | Yang et al. | | |
| 2017/0325084 A1* | 11/2017 | Larignon | ............... | H04L 67/306 |

OTHER PUBLICATIONS

Remote Provisioning Architecture for Embedded UICC Technical Specification, Version 3.0, dated Jun. 30, 2015.*
ETSI TS 102 221 V12.0.0, Smart Cards; UICC-Terminal interface; Physical and logical characteristics (Release 12), Dec. 2014.

\* cited by examiner

EMBEDDED UNIVERSAL INTEGRATED CIRCUIT CARD (EUICC) FILE SYSTEM MANAGEMENT WITH PROFILE SWITCHING

CROSS-REFERENCE TO RELATED APPLICATIONS

This application claims the benefit of U.S. Provisional Patent Application No. 62/266,464, entitled "EMBEDDED UNIVERSAL INTEGRATED CIRCUIT CARD (eUICC) FILE SYSTEM MANAGEMENT WITH PROFILE SWITCHING" and filed Dec. 11, 2015, the content of which is incorporated herein by reference in its entirety for all purposes.

FIELD

The described embodiments set forth various techniques for embedded Universal Integrated Circuit Card (eUICC) file system management with electronic Subscriber Identity Module (eSIM) profile switching.

BACKGROUND

Most mobile devices are configured to receive and operate removable Universal Integrated Circuit Cards (UICCs) that enable the mobile devices to access services provided by wireless service providers, which can include mobile network operators (MNOs) and virtual MNOs (VMNOs). In particular, each UICC includes at least a microprocessor and a read-only memory (ROM), where the ROM is configured to store different applets and authentication data that the mobile device can use to register and access services of the wireless service providers. Typically, a UICC takes the form of a small removable card (e.g., a SIM card) that is configured to store a single MNO profile and to be inserted into a UICC-receiving bay included in the mobile device. In more recent implementations, however, UICCs are being embedded directly into system boards of mobile devices and are configured to store one or more MNO profiles (e.g., electronic SIMs (eSIMs))—e.g., one eSIM (profile) for a local MNO, and another eSIM (profile) for an international MNO. Notably, these embedded UICCs (eUICCs) provide several advantages over traditional, removable UICCs. For example, some eUICCs include a rewritable memory that can facilitate eSIM addition, deletion, and updating for accessing new and/or different services provided by MNOs. EUICCs can also eliminate the necessity of including UICC-receiving bays within mobile devices. The implementation of eUICCs therefore not only increases the flexibility of mobile devices, but also simplifies their design and frees up space for other components.

Despite the foregoing advantages provided by eUICCs, new challenges arise with respect to maintaining backward compatibility with external processing modules designed to work with file systems as installed on and structured for UICCs, while also providing the increased flexibility offered by eUICCs, particularly with eSIM (profile) switching that impacts the file systems installed on eUICCs. Legacy file systems for legacy UICCs can mix MNO specific information with hardware specific (e.g., UICC based) information. File system management for eUICCs, on which eSIM profiles can be added, deleted, and/or modified, can be improved to allow for flexible eSIM profile management as well as retain backward compatibility with external processing modules, e.g., a terminal interface, that are also designed to work with legacy UICCs.

SUMMARY

Representative embodiments set forth herein disclose various techniques for dynamically organizing and managing file systems on an embedded Universal Integrated Circuit Card (eUICC) in response to electronic Subscriber Identity Module (eSIM) changes on the eUICC. Hardware specific file information, e.g., hardware-based eUICC parameters, which may apply to multiple eSIMs and/or to multiple MNOs, is included in a default eUICC file system. Mobile Network Operator (MNO) specific information, e.g., MNO-specified parameters, is included in individual eSIMs associated with corresponding MNOs. Customized eUICC level files are created, stored, modified, and/or replaced on the eUICC based at least in part on combining information from one or more default eUICC files and MNO specific information extracted from one or more eSIMs at installation and/or in response to a change of state of the one or more eSIMs, such as when enabling, disabling, or updating the one or more eSIMs on the eUICC.

A representative embodiment sets forth a method for file system management of an eUICC for an eSIM associated with an MNO. Specifically, the method is implemented at the eUICC that stores the eSIM, and includes: receiving an eSIM to be stored within the eUICC; storing the eSIM within the eUICC; parsing a file system of the eSIM to identify MNO specific information applicable to an eUICC level file; and updating the eUICC level file based at least in part on the MNO specific information.

Another representative embodiment sets forth a method for file system management of an eUICC for an eSIM associated with an MNO. Specifically, the method is implemented at the eUICC that stores the eSIM, and includes: obtaining an eSIM to be enabled within the eUICC; identifying MNO specific information in the eSIM; constructing at least one customized eUICC level file based on the MNO specific information; storing the at least one customized eUICC level file in the eUICC for future use; and updating corresponding eUICC level files based on the at least one customized eUICC level file, in response to receipt of an indication to enable the eSIM on the eUICC.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

A traditional, removable Universal Integrated Circuit Card (UICC) maintains a minimal file system (FS) with which to perform, at least in part, an initialization procedure for the UICC. Wireless service providers, such as a Mobile Network Operator (MNO), control access to their wireless services by distributing to subscribers customized UICCs, which may include pre-installed Subscriber Identity Module (SIM) profiles. The UICCs can be manufactured and customized according to the MNO's specifications. The FS of traditional, legacy UICCs includes files that may combine hardware specific information (e.g., parameters appropriate for the specific UICC) and MNO specific information (e.g., MNO specified parameters, and/or one or more SIM profiles for the MNO). With newer non-removable embedded UICCs (eUICCs) installed directly in mobile devices, MNO specific information can be added to the eUICC separately from manufacture and/or initialization of the eUICC and/or the mobile device. For example, SIM profiles and/or UICC software modules in a mobile device can be customized during distribution (post-manufacture), at a time of sale, and/or after delivery to a user. A single mobile device with an eUICC can be customized to work with one or more different MNOs, and as such, MNO specific information should be separable from eUICC (hardware-specific) information when possible. Furthermore, as eSIM profiles can be enabled and/or disabled under software control, the eUICC of a mobile device can exist in a state in which no eSIM profile is enabled on the eUICC. Legacy UICC files that include both hardware information and MNO specific information can be unable to be defined by an MNO for use in a mobile device that includes an eUICC, as the MNO eSIM can be installed and/or enabled in different mobile devices that include eUICCs from different manufacturers and/or versions. An MNO may seek to manage MNO specific parameters that apply to a broad variety of eUICCs manufactured for different mobile devices offered by different product manufacturers. A product manufacturer may also seek to manage hardware specific parameters independent of MNO specific requirements. As such, a dynamically customizable file system for the eUICC can provide flexibility in adapting various eUICC level files as eSIMs from different MNOs are installed, enabled, disabled, and/or modified.

A default eUICC file system can be dynamically updated based on eSIM profiles installed and/or enabled on the eUICC. The default eUICC file system can include a limited number of files stored at the eUICC level, e.g., directly at or below a master file (MF) level in the eUICC. The default eUICC file system can be available when no eSIMs are installed and/or enabled on the eUICC. The default eUICC file system can provide limited functionality for communication between the eUICC and external processing modules, such as with a terminal module executing on an applications processor communicatively coupled with the eUICC. A number of eUICC files in the default eUICC file system can include hardware specific parameters and/or configurations. Some initial communication procedures, e.g., as specified in ETSI TS 102 221, entitled "Smart Cards—UICC-Terminal Interface Physical and Logical Characteristics", and incorporated by reference herein in its entirety for all purposes, include requirements for a basic file system. For example, the basic file system for a UICC (and consequently also for an eUICC) includes a Master File (MF). Initialization of the UICC (and eUICC) can include an exchange of terminal communication capabilities after selection of an MF. Similarly, wireless circuitry, e.g., a baseband component, can expect a number of basic files to exist, such as an elementary file (EF) of a directory (DIR) type, an EF of an ICC Identifier (ICCID) type, a Universal SIM (USIM), or a combination of these, without which the baseband component may report an error. As described further herein, a set of eUICC level files can be included as a default file system for the eUICC and include sufficient information for initialization of the eUICC and communication with processing circuitry external to the eUICC. The default file system can be available even when no eSIMs are installed and/or enabled. The default file system can be updated and/or dynamically customized based on MNO specific information available from eSIMs when installed, enabled, disabled, and/or modified.

In some embodiments, a file system of an eUICC is updated based on changes to one or more eSIMs on the eUICC. Contents of certain files, particularly files at the eUICC level, can be updated and/or replaced with new files when changing eSIMs. For example the Master File (MF) for a default file system can be replaced with a customized MF based on MNO specific parameters extracted from (and/or derived from information in) one or more eSIMs. When an eSIM is enabled, disabled, and/or modified one or more files of the eUICC file system can be updated and/or replaced. In some embodiments, when an eSIM is installed on the eUICC, a file system image can be constructed based on information extracted from (and/or based on information available in) the eSIM, and the file system image can be stored in the eUICC for later use when the eSIM is enabled. Thus, real-time merging of files can be avoided by preparing customized file system images (and/or portions thereof, such as particular files of a file system) in advance. In some embodiments, when an eSIM is disabled on the eUICC, a previous file system image and/or a default file system image can replace the file system in use.

A more detailed discussion is provided below and described in conjunction with FIG. 1 to FIG. 7, which illustrate detailed diagrams of different systems and methods that can be used to implement these techniques.

Figure 1:
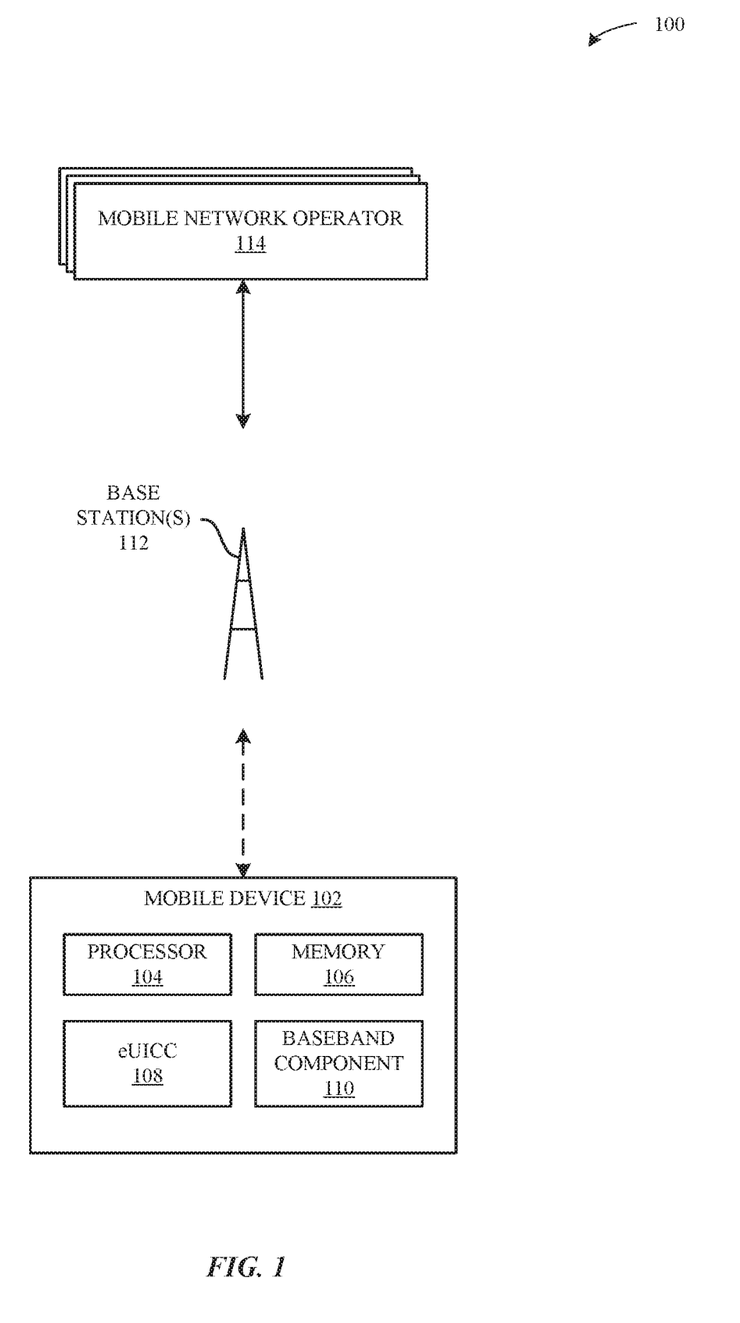
FIG. 1 illustrates a block diagram of different exemplary components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, one or more base stations 112, and one or more MNOs 114. According to one embodiment, the mobile device 102 represents a wireless communication device (e.g., a smart phone, a tablet, a laptop, etc.) that is configured (and/or configurable) to communicate with at least one of the MNOs 114 via at least one of the base stations 112. As shown in FIG. 1, the mobile device 102 can include a processor 104, a memory 106, an eUICC 108, and a baseband component 110. The eUICC 108 can represent, for example, a hardware component that is embedded within a system board of the mobile device 102 and is configured to provide a more flexible environment than traditional, removable UICCs (e.g., SIM cards). As described in greater detail below, the eUICC 108 can include a variety of hardware and software components that enable the eUICC 108 to manage one or more file systems on the eUICC in conjunction with changes to eSIMs on the eUICC 108, according to the techniques described herein. Although not illustrated in FIG. 1, the mobile device 102 can also be configured to include a receiving bay for a removable UICC (e.g., a SIM card), on which a file system for the UICC can likewise be managed dynamically as one or more eSIMs are changed on the UICC in a similar manner using the techniques described herein.

Figure 2:
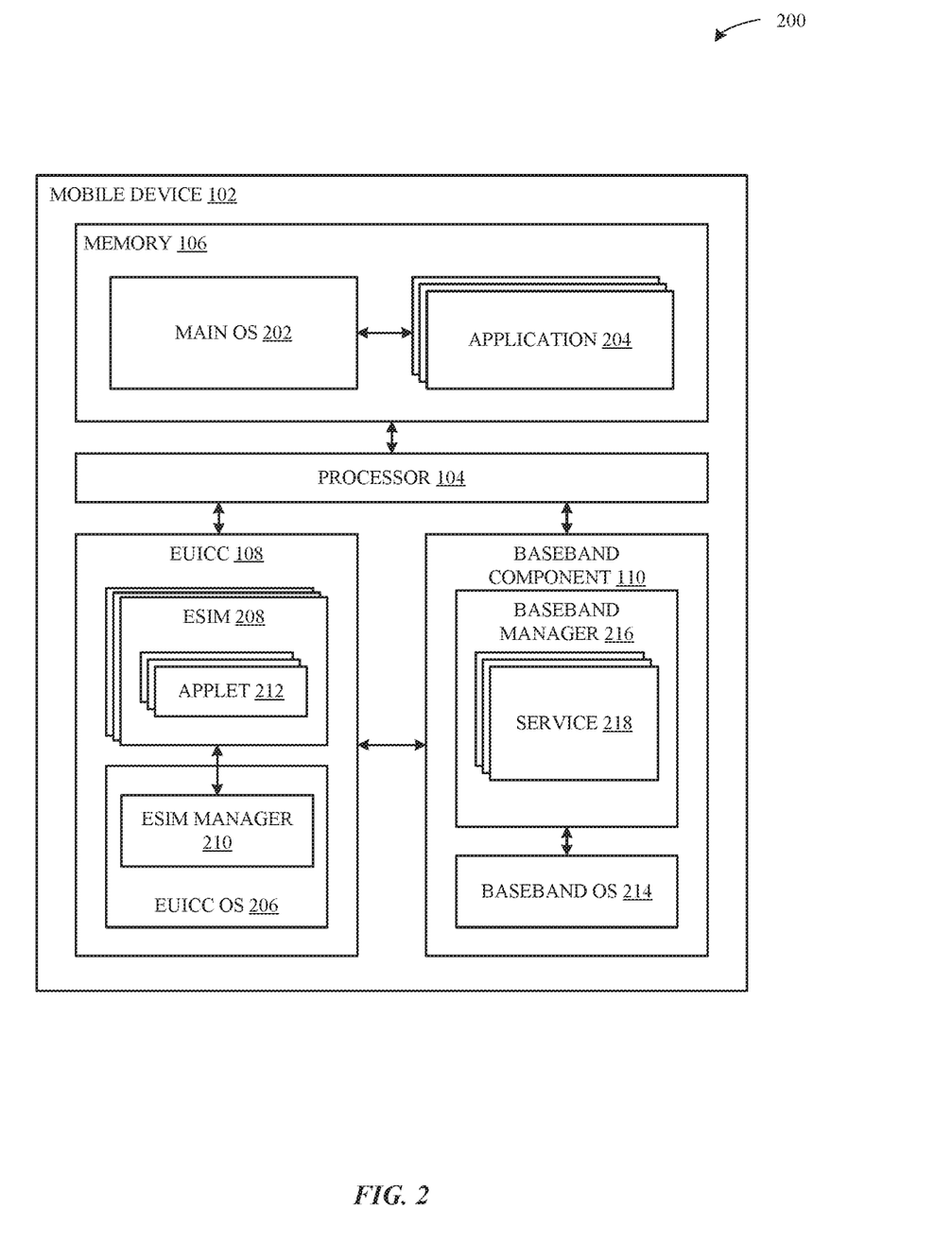
FIG. 2 illustrates a block diagram of a more detailed view of particular components of the system of FIG. 1, according to some embodiments.

FIG. 2 illustrates a block diagram of a more detailed view 200 of particular components of the mobile device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by activating, deactivating, modifying, or otherwise performing management of the eSIMs 208 within the eUICC 108 and providing the baseband component 110 with access to the eSIMs 208 to provide access to wireless services for the mobile device 102. The eUICC 108 OS can also perform file system management for eUICC 108 level files and update certain eUICC 108 level files based on changes in status and/or installation and/or removal of eSIMs 208 on the eUICC 108. The eUICC 108 OS can include an eSIM manager 210, which in some embodiments can be an Issue Security Domain (ISD) level application, a "security domain" in accordance with a GlobalPlatform specification, a security domain associated with one or more eSIMs and that calls additional eUICC OS installation services, and/or an application that implements a specific set of security services, e.g., for establishing and managing a secure channel and/or to provide encryption/decryption functions. The eSIM manager 210 can perform management functions for various eSIMs 208. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the mobile device 102 to communicate with an MNO 114 and provide useful features (e.g., phone calls and internet) to a user of the mobile device 102.

As also shown in FIG. 2, the baseband component 110 of the mobile device 102 can include a baseband OS 214 that is configured to manage hardware resources of the baseband component 110 (e.g., a processor, a memory, different radio components, etc.). According to some embodiments, the baseband component 110 can implement a manager 216 that is configured to interface with the eUICC 108 to implement various techniques described herein, which can include establishing a secure channel with a provisioning server 116 and obtaining information (such as eSIM 208 data) from the provisioning server 116 for purposes of managing eSIMs 208, including but not limited to provisioning, loading, installing, adding, modifying, updating, deleting, enabling, disabling, or performing other management operations for one or more eSIMs 208. As also shown in FIG. 2, the manager 216 can be configured to implement services 218, which represents a collection of software modules that are instantiated by way of the various applets 212 of enabled eSIMs 208 that are included in the eUICC 108. For example, services 218 can be configured to manage different connections between the mobile device 102 and MNOs 114 according to the different eSIMs 208 that are enabled within the eUICC 108.

Figure 3:
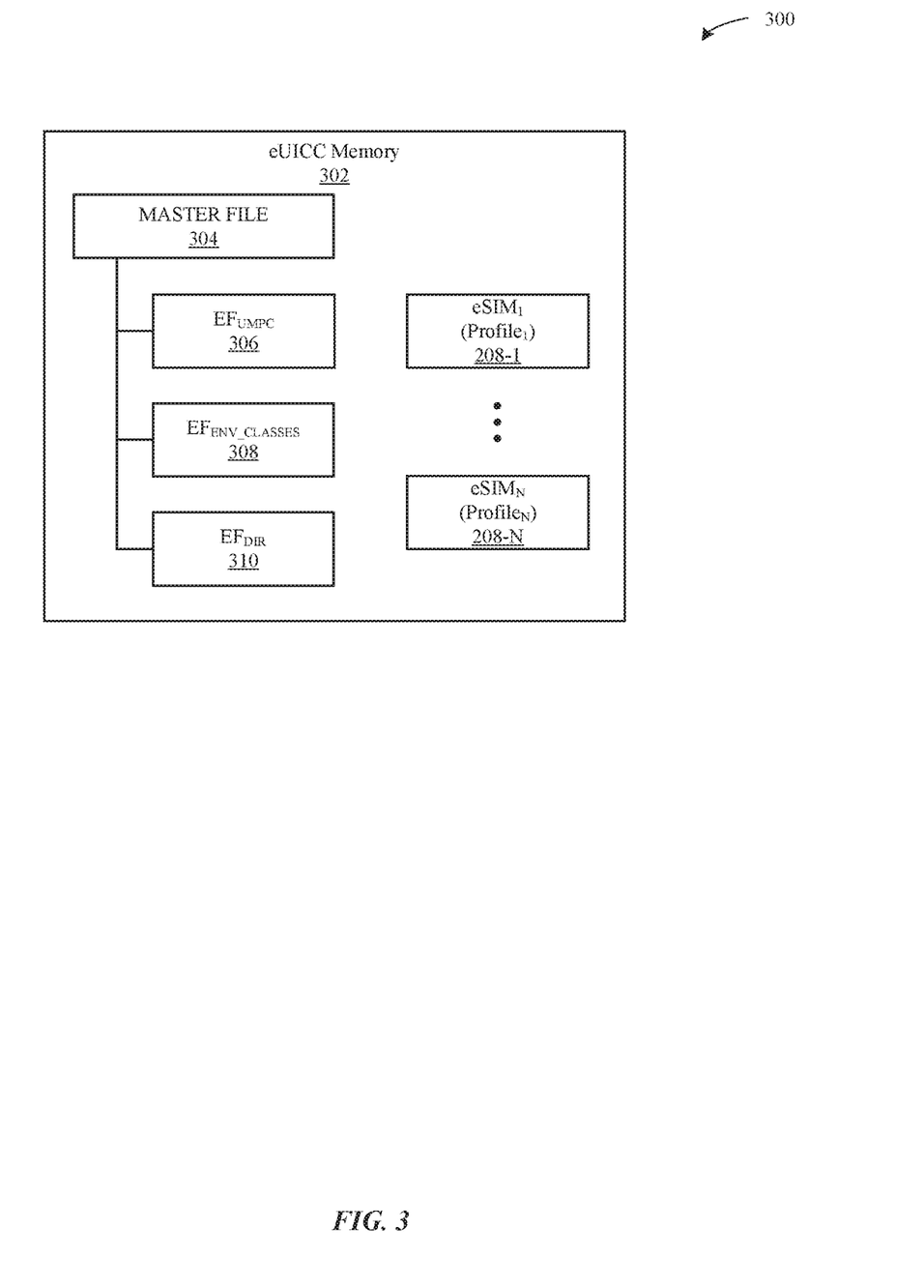
FIG. 3 illustrates a block diagram of an exemplary eUICC file system that can be implemented to manage eSIM profiles in the eUICC, according to some embodiments.

FIG. 3 illustrates a block diagram 300 of an eUICC 108 file system that can be implemented to manage eSIMs 208 (also referred to herein as profiles and/or as eSIM 208 profiles) in the eUICC 108, according to some embodiments. A limited number of basic files can be stored at the eUICC 108 level of the eUICC 108 and made available independent of whether any eSIMs 208 are installed and/or enabled. External processors of a mobile device 102 in which the eUICC 108 resides, such as processor 104 of the mobile device 102 show in FIGS. 1 and 2 can communicate with the eUICC 108 via a terminal module that expects certain files to be initialized and functional in order for the eUICC 108 to operate properly (e.g., in accordance with standardized UICC terminal interface requirements.) Within an eUICC memory 302 of the eUICC 108, the basic files of the eUICC 108 file system can include a Master File (MF) 304, which is related to a set of additional eUICC 108 level elementary files (EFs). The eUICC 108 level EFs can include an elementary file $EF_{UMPC}$ 306, an elementary file $EF_{EVN\_CLASSES}$ 308, and an elementary file $EF_{DIR}$ 310. The elementary file $EF_{UMPC}$ 306 specifies a number of hardware specific operating parameters, e.g., a UICC maximum power consumption (UMPC) and a UICC increased idle current value. Within a legacy UICC, the elementary file $EF_{UMPC}$ 306 can also include MNO defined parameters, such as an MNO defined time-out value that indicates a minimum time delay value for execution of commands by the UICC when external processing circuitry provides less than the allowed UICC maximum current level. Similarly, in an eUICC 108, such MNO defined time-out values can be required when using an eSIM 208 associated with an MNO. When provisioning the eUICC 108 initially, or in a default configuration, e.g., when no eSIMs 208 are enabled and/or installed, the eUICC 108 level file system can include a basic set of files that provide minimal functionality. The eUICC 108 level files can be updated, e.g., additional MNO specific information extracted from an eSIM 208 and merged with hardware specific information already resident (and/or updated based on the MNO specific information) in the eUICC 108 level files. For example, the elementary file $EF_{UMPC}$ 306 can be updated to include MNO defined parameters from an eSIM 208 when the eSIM 208 is installed and/or enabled. By separating MNO specific information from hardware-based information, an MNO can supply an eSIM 208 profile that applies to different eUICC 108 hardware configurations and/or for different mobile devices 102 and/or for different eUICC 108 manufacturers and/or for different mobile device 102 manufacturers/distributors/vendors. Hardware platform based parameters specific to the eUICC 108 hardware can be separated from service provider, e.g., mobile network operator (MNO), based parameters. Additional basic eUICC 108 level files can include hardware specific information that can be used with any combination of enabled/installed eSIMs 208. The elementary file $EF_{EVN\_CLASSES}$ 308 specifies hardware parameters for the eUICC 108 for different environment classes. The elementary file $EF_{DIR}$ 310 provides a directory of application files, such as eSIM 208 profiles resident on the eUICC 108. The eUICC 108 can include multiple eSIM 208 profiles, e.g., $eSIM_1$ 208-1 through $eSIM_N$ 208-N, which each can be configured in different states. When an eSIM 208 is installed and/or enabled, information specific to an MNO associated with the eSIM 208 can be merged into one or more of the eUICC 108 level files to update the file system based on the set of eSIMs 208 enabled on the eUICC 108. Similarly, when an eSIM 208 is modified, any information relevant to the eUICC 108 level files can also be updated. Furthermore, when an eSIM 208 is disabled, the eUICC 108 level files can be updated to remove (or otherwise mark as inactive) the MNO specific information for the disabled eSIM 208 when no longer required. In some embodiments, when multiple eSIMs 208 are associated with the same MNO and/or use the same MNO specific parameters for one or more of the eUICC 108 level files, minimal or no updating of the eUICC 108 level files may be needed except when changing between a state when no eSIMs 208 are enabled for an associated MNO and a state when at least one eSIM 208 is enabled for the associated MNO.

Figure 4:
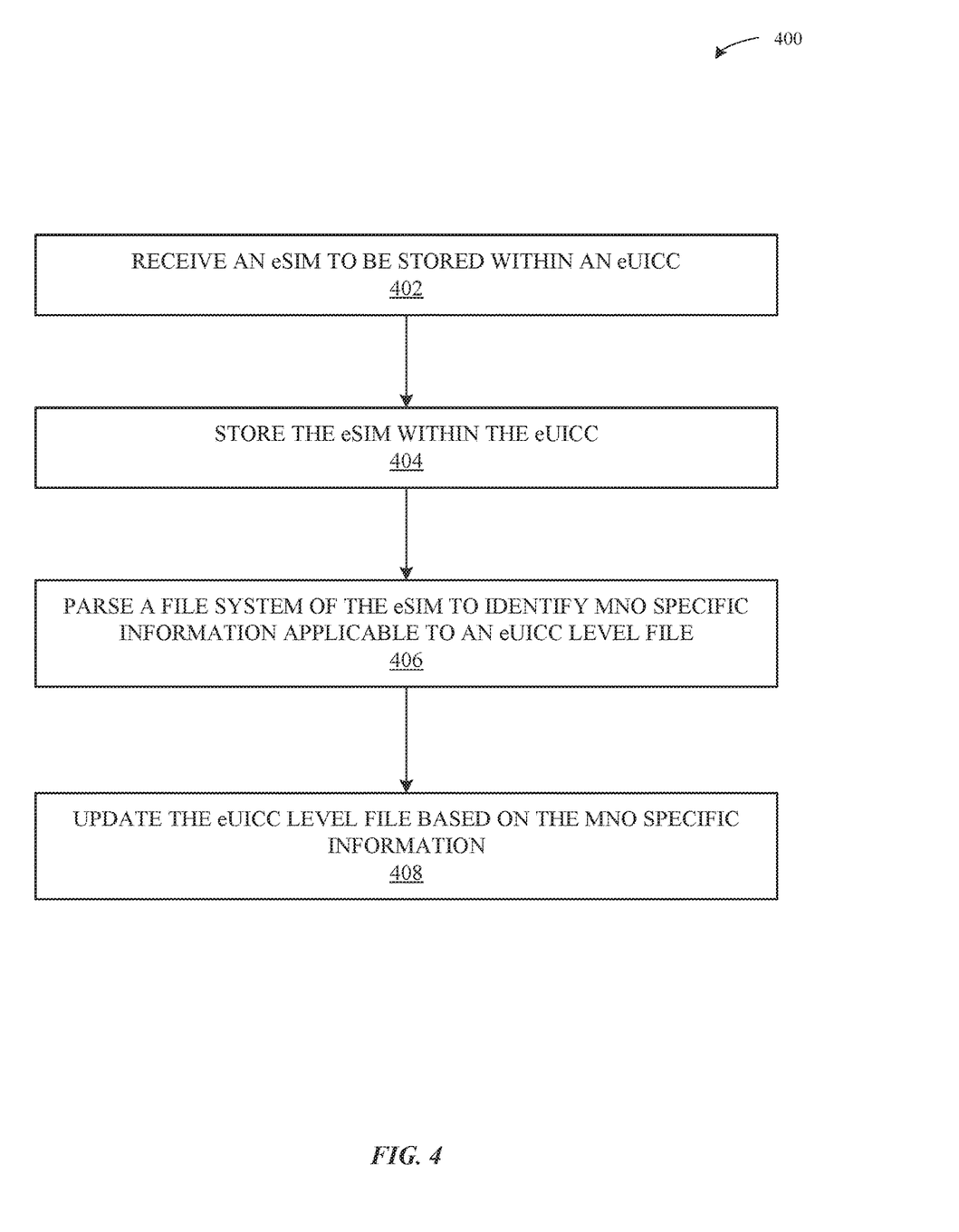
FIG. 4 illustrates an example method for file system management of the eUICC file system based on a received eSIM profile, according to some embodiments.

FIG. 4 illustrates a flowchart 400 for a representative method for file system management of an eUICC 108 file system based on a received eSIM 208 profile, according to some embodiments. At 402, the eUICC 108 of a mobile device 102 can receive an eSIM 208 profile, and at 404, the eUICC 108 can store the eSIM 208 profile within the eUICC 108. At 406, the eUICC 108 can parse a file system of the eSIM 208 profile to identify MNO specific information applicable to an eUICC 108 level file. In some embodiments, the MNO specific information can apply to multiple eUICC 108 level files. At 408, the eUICC 108 can update the eUICC 108 level file based on the MNO specific information identified in the eSIM 208 profile. In some embodiments, one or more eUICC 108 level files can be created by merging MNO specific information (and/or based on such MNO specific information) extracted from the eSIM 208 profile with one or more generic (or previously modified) eUICC 108 level files. The updated eUICC 108 level files created by the merging can be stored in the eUICC 108 to be ready for use if and when the eSIM 208 profile is enabled. In some embodiments, the updated eUICC 108 level files replace current versions of corresponding eUICC 108 level files when the eSIM 208 profile is enabled. In some embodiments, the previous versions of eUICC 108 level files are stored for backup and/or to allow for reversion to previous versions of eUICC 108 level files, e.g., when disabling the eSIM 208 profile and/or when removing the eSIM 208 profile. In some embodiments, a default version of one or more eUICC 108 level files are stored in the eUICC 108, e.g., for use when no eSIM 208 profiles are enabled and/or installed on the eUICC 108. In some embodiments, past versions (other than default versions) of one or more eUICC 108 level files are not stored in the eUICC 108, and new versions of the one or more eUICC 108 level files are created, as required, based at least in part on eSIM 208 installation, enabling, disabling, modifying, updating, removing, or other applicable eSIM 208 profile management functions.

Figure 5:
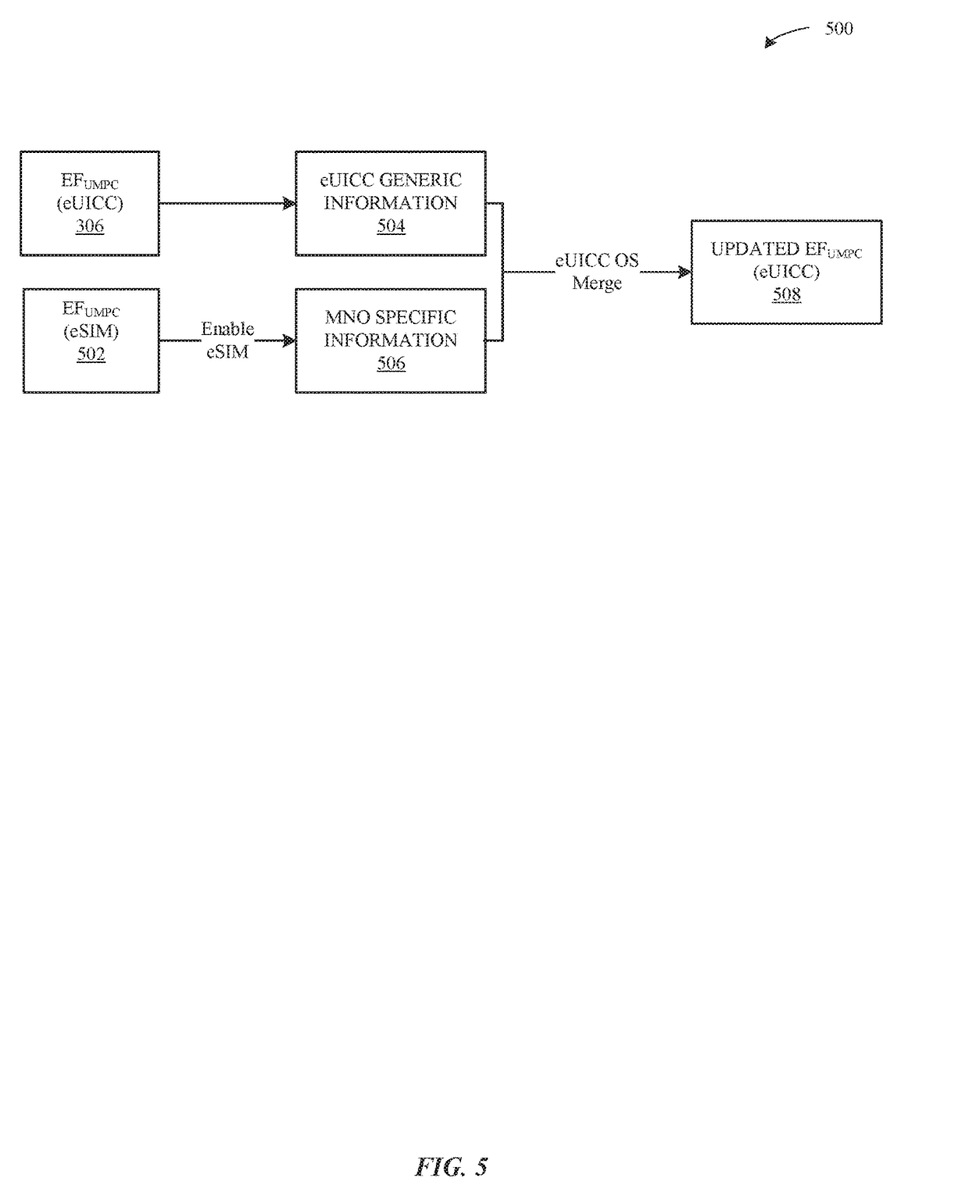
FIG. 5 illustrates a flow diagram for merging hardware specific information with MNO specific information to update an eUICC file system based on an eSIM profile, according to some embodiments.

FIG. 5 illustrates a flow diagram 500 for merging hardware specific information (such as for an eUICC 108) and MNO specific information (e.g., from an eSIM 208 profile) to update an eUICC 108 file system based on the eSIM 208 profile, according to some embodiments. A default (or present version) eUICC 108 level file, e.g., elementary file $EF_{UMPC}$ 306 can contain eUICC generic information 504 (relevant to the eUICC 108). Additional information associated with an MNO can be extracted from an MNO provided file, e.g., from the eSIM 208 profile. The additional MNO specific information can apply to one or more different eUICC 108 level files. For example, the eSIM 208 profile can contain MNO specific information 506 applicable to an elementary file, such as to elementary file $EF_{UMPC}$ 306 as shown in FIG. 3 or to elementary file $EF_{UMPC}$ 502 as shown in FIG. 5. The eUICC generic information 504 can be merged by the eUICC OS 206 with the MNO specific information 506 to create an updated eUICC 108 level file, e.g., an updated elementary file $EF_{UMPC}$ 508. In some embodiments, the updated elementary file $EF_{UMPC}$ 508 is created when the eSIM 208 profile is installed on the eUICC 108 and stored in the eUICC 108 for use when the eSIM 208 profile is enabled, e.g., to separate the process of merging information from eSIM 208 profiles from enabling of eSIMs 208. In some embodiments, the updated elementary file $EF_{UMPC}$ 508 is created in real-time when the eSIM 208 is enabled based at least in part on a presently in use eUICC 108 elementary file $EF_{UMPC}$ 502 and on MNO specific information 506 extracted from the eSIM 208 profile. In some embodiments, such as when only one eSIM 208 profile is enabled at a time, when switching between eSIM 208 profiles, corresponding elementary files $EF_{UMPC}$ 508 for the eSIM 208 can be already stored, e.g., when each eSIM 208 is installed, corresponding elementary files that be customized with information extracted from the eSIM 208, such as elementary file $EF_{UMPC}$ 508, can be created and stored in the eUICC 108 and available for immediate use when enabling an eSIM 208 profile. Thus, switching between eSIM 208 profiles can be aided by switching between different sets of eUICC 108 level elementary files when switching eSIM 208 profiles. When more than one eSIM 208 profile can be enabled simultaneously in the eUICC 108, one or more updated eUICC 108 level elementary files can be created when applicable elementary files based on the combination of eSIM 208 profiles that will be enabled are not pre-stored on the eUICC 108.

Figure 6:
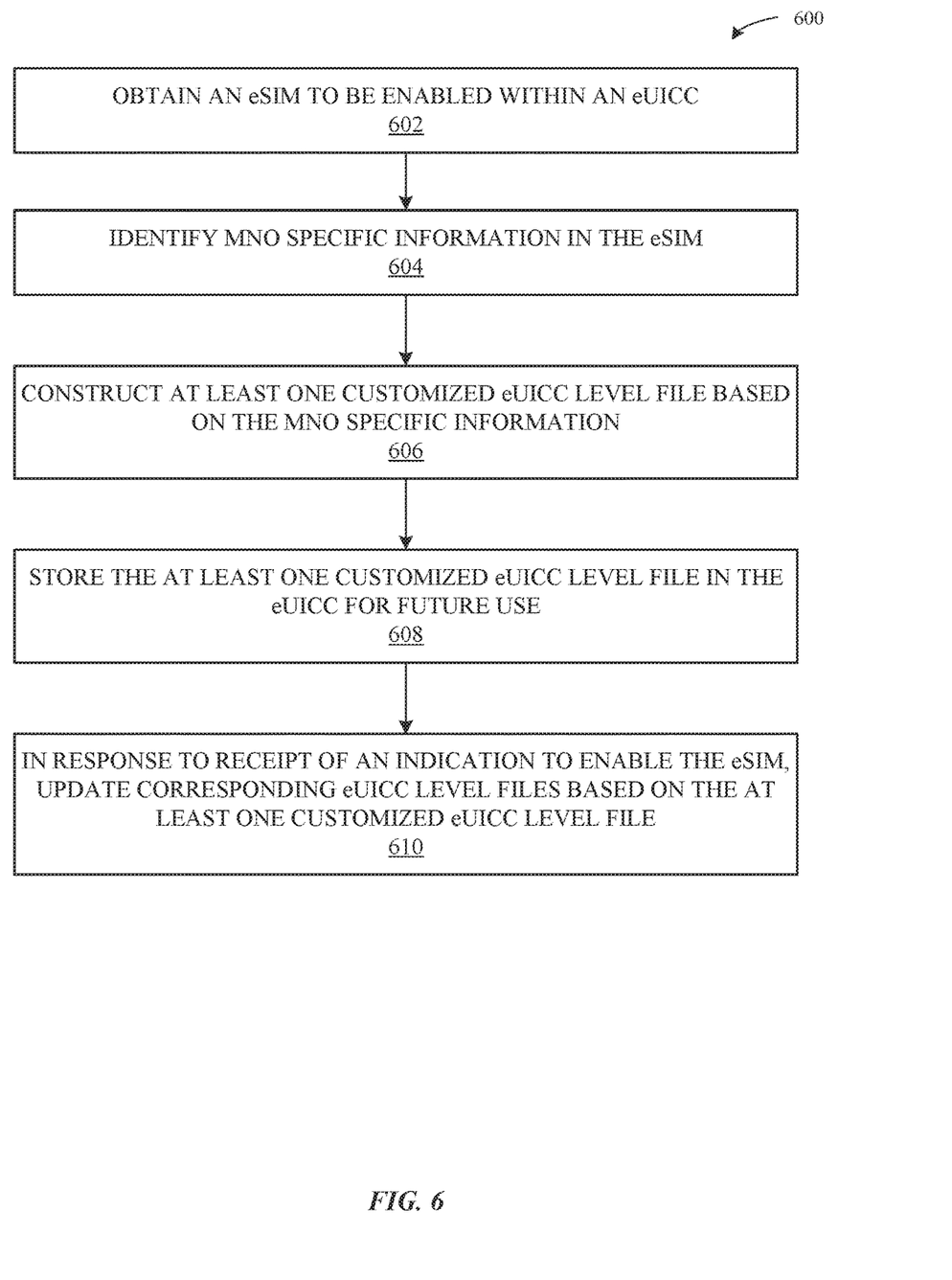
FIG. 6 illustrates another example method for file system management of the eUICC file system based on an obtained eSIM profile, according to some embodiments.

FIG. 6 illustrates a flowchart 600 for another exemplary method for file system management of an eUICC 108 level file system based on an obtained eSIM 208 profile, according to some embodiments. At 602, the eUICC 108 obtains an eSIM 208 profile to be enabled within the eUICC 108. In some embodiments, the eSIM 208 profile is stored in the eUICC 108 for future use, e.g., not enabled when installed. In some embodiments, the eSIM 208 profile is stored in the eUICC 108 and also enabled as part of installation of the eSIM 208 profile. In some embodiments, the eUICC 108 receives one or more eSIM 208 management commands, e.g., via a terminal interface from an external processor 104 of the mobile device 102, to enable an eSIM 208 profile already stored in the eUICC 108. At 604, the eUICC 108 identifies MNO specific information in the eSIM 208. In some embodiments, the MNO specific information applies to one or more different eUICC 108 level files. At 606, the eUICC 108 constructs at least one customized eUICC 108 level file based on the identified MNO specific information from the eSIM 208 profile. At 608, the eUICC 108 stores the at least one customized eUICC 108 level file in the eUICC 108 for future use, e.g., when enabling the eSIM 208. At 610, the eUICC updates corresponding eUICC 108 level files based on the at least one customized eUICC 108 level file, in response to receipt of an indication to enable the eSIM 208. In some embodiments, updating the corresponding eUICC 108 level files includes replacing presently used eUICC 108 level files with one or more of the at least one customized eUICC 108 level files. In some embodiments, updating the corresponding eUICC 108 level files includes modifying parameters for the eUICC 108 level files based on the stored at least one customized eUICC 108 level files. In some embodiments, customized eUICC 108 level files are dynamically created in response to enabling an eSIM 208 profile. In some embodiments, customized eUICC 108 level files are accessed (e.g., from storage in the eUICC 108) when an eSIM 208 profile is enabled, disabled, modified, updated, installed, and/or removed from the eUICC 108.

Figure 7:
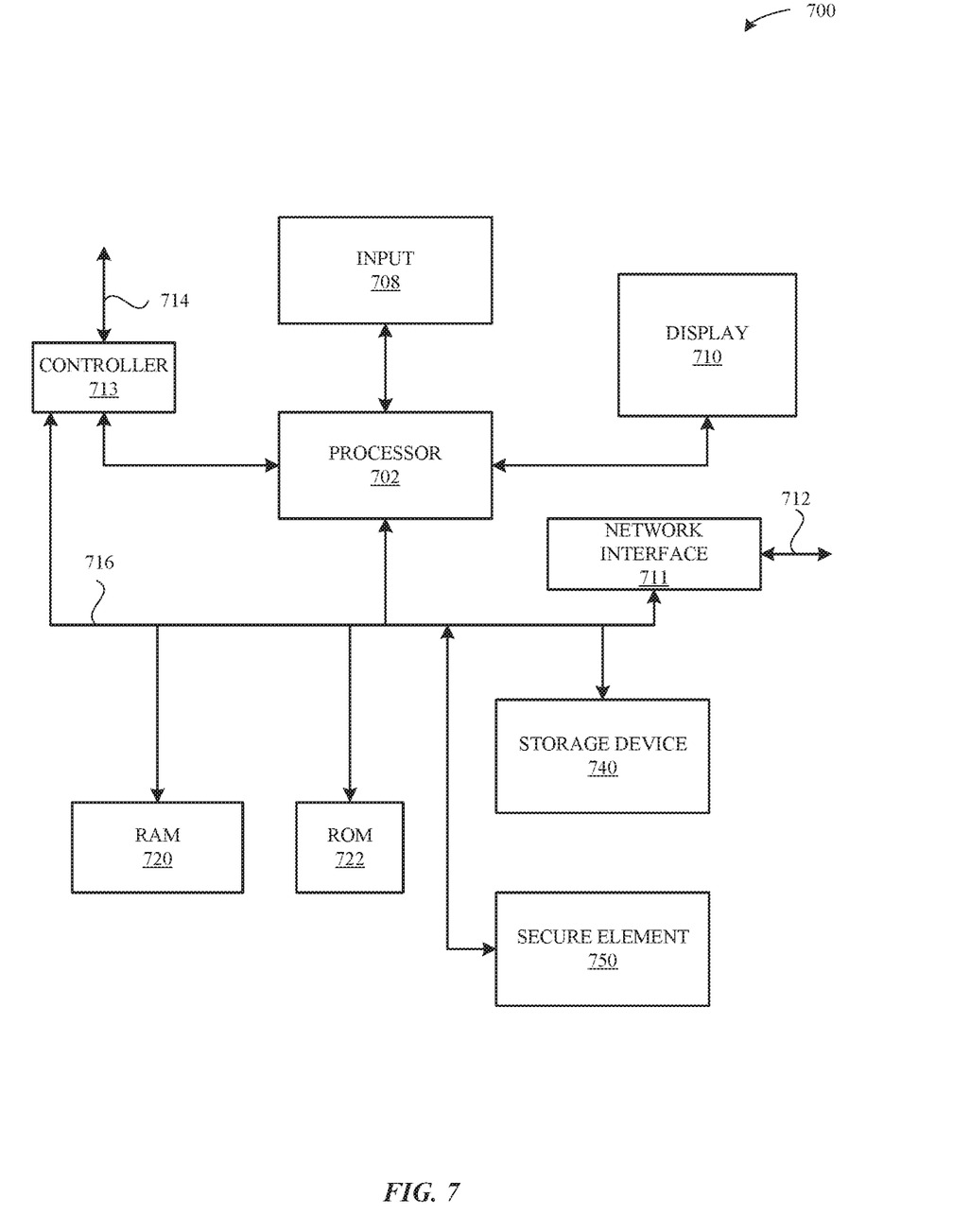
FIG. 7 illustrates a detailed view of an exemplary computing device that can be used to implement the various apparatuses and methods described herein, according to some embodiments.

FIG. 7 illustrates a detailed view of a computing device 700 that can be used to implement the various components described herein, according to some embodiments. In particular, the detailed view illustrates various components that can be included in the mobile device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include the storage device 740, which can represent a single storage device or multiple storage devices, and includes a storage management module that manages one or more partitions within the storage device 740. In some embodiments, storage device 740 can include solid-state memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the different software processes described herein. When the computing device 700 represents a mobile device 102, the computing device 700 can further include a secure element 750 that can represent the eUICC 108 illustrated in FIGS. 1 and 2 and described in detail herein.

Representative Embodiments

In some embodiments, a method for file system management on an embedded Universal Integrated Circuit Card (eUICC) includes the eUICC: receiving a request to store an electronic Subscriber Identify Module (eSIM) within a memory that is accessible to the eUICC; and in response to the request: storing the eSIM into the memory, parsing a file system of the eSIM to identify Mobile Network Operator (MNO) specific information applicable to an eUICC level file, and updating the eUICC level file based at least in part on the identified MNO specific information.

In some embodiments, the eUICC is included in a mobile device configured to access wireless services provided by the MNO while the eSIM is installed and enabled on the eUICC. In some embodiments, the memory is included within the eUICC. In some embodiments, updating the eUICC level file based at least in part on the identified MNO specific information includes merging at least part of the MNO specific information with a present version of the eUICC level file. In some embodiments, the method further includes the eUICC storing the updated eUICC level file in the memory for future use. In some embodiments, the method further includes the eUICC replacing a present version of the eUICC level file with the stored updated eUICC level file in response to receipt of a command to enable the eSIM. In some embodiments, the eUICC level file includes an elementary file (EF) that includes hardware specific parameters for the eUICC. In some embodiments, the updated eUICC level file includes an elementary file (EF) that includes hardware specific parameters for the eUICC and MNO specific parameters for the eSIM. In some embodiments, the MNO specific information in the eSIM includes an elementary file (EF) or a data object that defines one or more operating parameters for the eUICC and specified by the MNO. In some embodiments, the method further includes the eUICC replacing a present version of the eUICC level file with a default stored eUICC level file in response to receipt of a command to disable one or more eSIMs of the eUICC after which no eSIMS will be enabled on the eUICC.

In some embodiments, an apparatus configurable for operation in a mobile device includes a memory and a processor communicatively couple to the memory and configured to cause the apparatus to carry out steps that include: receiving a request to store an electronic Subscriber Identify Module (eSIM) within the memory; and in response to the request: storing the eSIM into the memory, parsing a file system of the eSIM to identify Mobile Network Operator (MNO) specific information applicable to an eUICC level file, and updating the eUICC level file based at least in part on the identified MNO specific information.

In some embodiments, the apparatus is an embedded Universal Integrated Circuit Card (eUICC) included in the mobile device. In some embodiments, the mobile device is configured to access wireless services provided by the MNO while the eSIM is installed and enabled on an eUICC included in the mobile device. In some embodiments, the memory is included within an eUICC. In some embodiments, updating the eUICC level file based at least in part on the identified MNO specific information includes merging at least part of the MNO specific information with a present version of the eUICC level file. In some embodiments, the steps carried out by the apparatus further include storing the updated eUICC level file in the memory for future use. In some embodiments, the steps carried out by the apparatus further include replacing a present version of the eUICC level file with the stored updated eUICC level file in response to receipt of a command to enable the eSIM. In some embodiments, the eUICC level file includes an elementary file (EF) that includes hardware specific parameters for an eUICC. In some embodiments, the updated eUICC level file includes an elementary file (EF) that includes hardware specific parameters for an eUICC and MNO specific parameters for the eSIM. In some embodiments, the MNO specific information in the eSIM includes an elementary file (EF) or a data object that defines one or more operating parameters for an eUICC and specified by the MNO. In some embodiments, the steps carried out by the apparatus further include replacing a present version of the eUICC level file with a default stored eUICC level file in response to receipt of a command to disable one or more eSIMs after which no eSIMs will be enabled for the mobile device. In some embodiments, the eSIMs are stored in an eUICC of the mobile device.

In some embodiments, a mobile device includes an electronic Universal Integrated Circuit Card (eUICC); and a processor configured to cause the mobile device to carry out steps that include: receiving a request to store an electronic Subscriber Identify Module (eSIM) within a memory that is accessible to the eUICC; and in response to the request: storing the eSIM into the memory, parsing a file system of the eSIM to identify Mobile Network Operator (MNO) specific information applicable to an eUICC level file, and updating the eUICC level file based at least in part on the identified MNO specific information.

In some embodiments, the mobile device is configured to access wireless services provided by the MNO while the eSIM is installed and enabled on the eUICC. In some embodiments, the memory is included within the eUICC. In some embodiments, updating the eUICC level file based at least in part on the identified MNO specific information includes merging at least part of the MNO specific information with a present version of the eUICC level file. In some embodiments, the steps carried out by the mobile device further include storing the updated eUICC level file in the memory for future use. In some embodiments, the steps carried out by the mobile device further include replacing a present version of the eUICC level file with the stored updated eUICC level file in response to receipt of a command to enable the eSIM. In some embodiments, the eUICC level file includes an elementary file (EF) that includes hardware specific parameters for the eUICC. In some embodiments, the updated eUICC level file includes an elementary file (EF) that includes hardware specific parameters for the eUICC and MNO specific parameters for the eSIM. In some embodiments, the MNO specific information in the eSIM includes an elementary file (EF) or a data object that defines one or more operating parameters for the eUICC and specified by the MNO. In some embodiments, the steps carried out by the mobile device further include replacing a present version of the eUICC level file with a default stored eUICC level file in response to receipt of a command to disable one or more eSIMs of the eUICC after which no eSIMs will be enabled on the eUICC.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for file system management on an embedded Universal Integrated Circuit Card (eUICC), the method comprising:
   by the eUICC:
   receiving a request to store an electronic Subscriber Identify Module (eSIM) within a memory that is accessible to the eUICC;
   in response to the request:
      storing the eSIM into the memory,
      parsing a file system of the eSIM to identify Mobile Network Operator (MNO) specific information applicable to an eUICC level file, and
      updating the eUICC level file based at least in part on the identified MNO specific information,
      wherein the eUICC level file:
         comprises hardware-based information specific to the eUICC,
         is stored separately from eSIMs of the eUICC, and
         in a default configuration, when no eSIMs are enabled and/or installed on the eUICC, includes no MNO specific information for the eSIMs of the eUICC; and
      replacing a present version of the eUICC level file with a default stored eUICC level file when receiving a command to disable one or more eSIMs of the eUICC after which no eSIMs would be enabled on the eUICC.

2. The method of claim 1, wherein the eUICC is included in a mobile device configured to access wireless services provided by the MNO while the eSIM is installed and enabled on the eUICC.

3. The method of claim 1, wherein the memory is included within the eUICC.

4. The method of claim 1, wherein the updating the eUICC level file based at least in part on the identified MNO specific information comprises merging at least part of the MNO specific information with the present version of the eUICC level file.

5. The method of claim 1, further comprising:
   by the eUICC:
   storing the updated eUICC level file in the memory for future use.

6. The method of claim 5, further comprising:
   by the eUICC:
   replacing the present version of the eUICC level file with the stored updated eUICC level file in response to receipt of a command to enable the eSIM.

7. The method of claim 1, wherein the eUICC level file comprises an elementary file (EF) that includes hardware specific parameters for the eUICC.

8. The method of claim 1, wherein the updated eUICC level file comprises an elementary file (EF) that includes hardware specific parameters for the eUICC and MNO specific parameters for the eSIM.

9. The method of claim 1, wherein the MNO specific information in the eSIM comprises an elementary file (EF) or a data object that defines one or more operating parameters for the eUICC and specified by the MNO.

10. An apparatus configurable for operation in a mobile device, the apparatus comprising:
    a memory; and
    a processor communicatively coupled to the memory and configured to cause the apparatus to carry out steps that include:
       receiving a request to store an electronic Subscriber Identify Module (eSIM) within the memory;
       in response to the request:
          storing the eSIM into the memory,
          parsing a file system of the eSIM to identify Mobile Network Operator (MNO) specific information applicable to an eUICC level file, and
          updating the eUICC level file based at least in part on the identified MNO specific information,
          wherein the eUICC level file:
             comprises hardware-based information specific to the eUICC, is stored separately from eSIMs of the eUICC, and
             in a default configuration, when no eSIMs are enabled and/or installed on the eUICC, includes no MNO specific information for the eSIMs of the eUICC; and
          replacing a present version of the eUICC level file with a default stored eUICC level file when receiving a command to disable one or more eSIMs of the eUICC after which no eSIMs would be enabled on the eUICC.

11. The apparatus of claim 10, wherein:
    the apparatus is an embedded Universal Integrated Circuit Card (eUICC) included in the mobile device; and
    the mobile device is configured to access wireless services provided by the MNO while the eSIM is installed and enabled on the eUICC.

12. The apparatus of claim 10, wherein the updating the eUICC level file based at least in part on the identified MNO specific information comprises merging at least part of the MNO specific information with the present version of the eUICC level file.

13. The apparatus of claim 10, wherein the steps further include:
    storing the updated eUICC level file in the memory for future use; and
    replacing the present version of the eUICC level file with the stored updated eUICC level file in response to receipt of a command to enable the eSIM.

14. The apparatus of claim 10, wherein the updated eUICC level file comprises an elementary file (EF) that includes hardware specific parameters for the eUICC and MNO specific parameters for the eSIM.

15. The apparatus of claim 10, wherein the MNO specific information in the eSIM comprises an elementary file (EF)

or a data object that defines one or more operating parameters for the eUICC and specified by the MNO.

16. A mobile device comprising:
an electronic Universal Integrated Circuit Card (eUICC);
a processor configured to cause the mobile device to carry out steps that include:
receiving a request to store an electronic Subscriber Identify Module (eSIM) within a memory that is accessible to the eUICC;
in response to the request:
storing the eSIM into the memory,
parsing a file system of the eSIM to identify Mobile Network Operator (MNO) specific information applicable to an eUICC level file, and
updating the eUICC level file based at least in part on the identified MNO specific information,
wherein the eUICC level file:
comprises hardware-based information specific to the eUICC,
is stored separately from eSIMs of the eUICC, and
in a default configuration, when no eSIMs are enabled and/or installed on the eUICC, includes no MNO specific information for the eSIMs of the eUICC; and
replacing a present version of the eUICC level file with a default stored eUICC level file when receiving a command to disable one or more eSIMs of the eUICC after which no eSIMs would be enabled on the eUICC.

17. The mobile device of claim 16, wherein the updating the eUICC level file based at least in part on the identified MNO specific information comprises merging at least part of the MNO specific information with the present version of the eUICC level file.

18. The mobile device of claim 16, wherein the steps further include:
storing the updated eUICC level file in the memory for future use; and
replacing the present version of the eUICC level file with the stored updated eUICC level file in response to receipt of a command to enable the eSIM.

19. The mobile device of claim 16, wherein the updated eUICC level file comprises an elementary file (EF) that includes hardware specific parameters for the eUICC and MNO specific parameters for the eSIM.

20. The mobile device of claim 16, wherein the MNO specific information in the eSIM comprises an elementary file (EF) or a data object that defines one or more operating parameters for the eUICC and specified by the MNO.

* * * * *